US011359066B2

(12) United States Patent
Ponticiello et al.

(10) Patent No.: US 11,359,066 B2
(45) Date of Patent: Jun. 14, 2022

(54) EXPANDABLE COMPOSITIONS CONTAINING AROMATIC VINYL POLYMERS HAVING SELF-EXTINGUISHING PROPERTIES AND IMPROVED PROCESSABILITY

(71) Applicant: Versalis S.p.A., San Donato Milanese (IT)

(72) Inventors: Antonio Ponticiello, Mozzecane (IT); Dario Ghidoni, Gonzaga (IT); Francesco Pasquali, Verona (IT)

(73) Assignee: Versalis S.P.A., San Donato Milanese (IT)

( * ) Notice: Subject to any disclaimer, the term of this patent is extended or adjusted under 35 U.S.C. 154(b) by 0 days.

(21) Appl. No.: 16/313,765

(22) PCT Filed: Jul. 7, 2017

(86) PCT No.: PCT/EP2017/067128
§ 371 (c)(1),
(2) Date: Dec. 27, 2018

(87) PCT Pub. No.: WO2018/007602
PCT Pub. Date: Jan. 11, 2018

(65) Prior Publication Data
US 2019/0144622 A1  May 16, 2019

(30) Foreign Application Priority Data
Jul. 8, 2016  (IT) .................. 102016000071347

(51) Int. Cl.
*C08J 9/12* (2006.01)
*C08J 9/00* (2006.01)
*C08K 3/04* (2006.01)
*C08K 5/136* (2006.01)
*C08L 25/12* (2006.01)
*C08L 53/02* (2006.01)
*C08L 63/00* (2006.01)

(52) U.S. Cl.
CPC .......... *C08J 9/0019* (2013.01); *C08J 9/0023* (2013.01); *C08J 9/0061* (2013.01); *C08J 9/0066* (2013.01); *C08J 9/12* (2013.01); *C08K 3/04* (2013.01); *C08K 5/136* (2013.01); *C08L 25/12* (2013.01); *C08L 53/025* (2013.01); *C08L 63/00* (2013.01); *C08J 2325/02* (2013.01); *C08J 2425/18* (2013.01); *C08J 2463/00* (2013.01); *C08K 2201/005* (2013.01); *C08K 2201/006* (2013.01); *C08L 2201/02* (2013.01); *C08L 2203/14* (2013.01)

(58) Field of Classification Search
CPC .............. C08L 2201/02; C08L 2203/14; C08F 257/02; C08J 2325/06; C08J 9/12; C08J 2453/02
See application file for complete search history.

(56) References Cited

U.S. PATENT DOCUMENTS

| 4,542,164 | A | 9/1985 | Nishioka et al. |
| 5,216,059 | A | 6/1993 | Atwell et al. |
| 5,717,001 | A | 2/1998 | Books et al. |
| 6,780,348 | B1 | 8/2004 | Loos et al. |
| 7,320,585 | B2 | 1/2008 | Casalini |
| 7,405,254 | B2 | 7/2008 | Muylem et al. |
| 7,612,119 | B2* | 11/2009 | Ponticiello ............. C08J 9/0066 521/56 |
| 2005/0123638 | A1 | 6/2005 | Casalini |
| 2006/0276557 | A1* | 12/2006 | Ponticiello ............. C08J 9/0066 521/50 |
| 2008/0200573 | A1 | 8/2008 | Maxwell et al. |
| 2008/0287559 | A1 | 11/2008 | King et al. |
| 2011/0046249 | A1* | 2/2011 | Ponticiello ............. C08J 9/0066 521/60 |
| 2011/0275730 | A1 | 11/2011 | Gordon-Duffy et al. |
| 2012/0214885 | A1 | 8/2012 | Tarumoto et al. |
| 2014/0235768 | A1 | 8/2014 | Lee et al. |
| 2015/0259521 | A1 | 9/2015 | Ponticiello et al. |
| 2016/0222181 | A1* | 8/2016 | La Piccirella .......... C08L 25/14 |

FOREIGN PATENT DOCUMENTS

| CN | 102015851 A | 4/2011 |
| CN | 102459435 A | 5/2012 |
| DE | 10115455 A1 | 10/2001 |

(Continued)

OTHER PUBLICATIONS

International Search Report and Written Opinion for PCT/EP2017/067128, dated Jul. 28, 2017, 13 pages.
Pure Appl. Chem., 1995, vol. 67, N. 3, pp. 473-506, Recommended terminology for the description of carbon as a solid (IUPAC Recommendations 1995).
More information on the characteristics of the different types of coke that can be used in the present invention, production and characterization methods of the different grades commercially available (green coke, coal-derived pitch coke, delayed coke, fluid coke, needle coke, premium coke, calcined coke) are available online, on the website http://goldbook.iupac.org.
Journal of Macromolecular Science, Review in Macromolecular Chemistry and Physics C31 (263) 215-299 (1991).
Notice of Opposition issued by the European Patent Office for patent EP3481891B1, mail date Jan. 25, 2021, 20 pages. Opposition filed by BASF SE/DE.

(Continued)

*Primary Examiner* — Gregory Listvoyb
(74) *Attorney, Agent, or Firm* — Praedcere Law

(57) ABSTRACT

The present invention relates to an expandable polymeric composition comprising: a) a polymeric matrix containing vinyl aromatic polymers and/or copolymers; b) from 0.1% to 20% by weight, calculated on the polymeric matrix (a), of an athermanous agent; c) from 0.01% to 10% by weight, calculated on the polymeric matrix (a), of at least one non-polymeric brominated flame retardant additive; d) from 0.01% to 10% by weight, calculated on the polymeric matrix (a), of at least one brominated polymer containing at least 50% bromine; e) from 0.01% to 5% by weight, calculated on the polymeric matrix (a), of a synergistic flame retardant additive; f) from 1% by weight to 10% by weight of at least one blowing agent.

16 Claims, No Drawings

(56) References Cited

FOREIGN PATENT DOCUMENTS

| | | | |
|---|---|---|---|
| EP | 2426152 | A1 | 3/2012 |
| EP | 2426165 | A1 | 3/2012 |
| EP | 2495277 | A1 | 9/2012 |
| EP | 3070118 | A1 | 9/2016 |
| JP | S60206845 | A | 10/1985 |
| JP | 2013514397 | A | 4/2013 |
| JP | 2014148661 | A | 8/2014 |
| JP | 2015007156 | A | 1/2015 |
| JP | 2015101702 | A | 6/2015 |
| JP | 2016017165 | A | 2/2016 |
| JP | 2016505076 | A | 2/2016 |
| WO | WO 01/29124 | A1 | 4/2001 |
| WO | WO2004041919 | A2 | 5/2004 |
| WO | WO2007019120 | A1 | 2/2007 |
| WO | WO 2007/058736 | A1 | 5/2007 |
| WO | WO2007058736 | A1 | 5/2007 |
| WO | WO2009108453 | A1 | 9/2009 |
| WO | WO2009133167 | A1 | 11/2009 |
| WO | WO2010099020 | A2 | 9/2010 |
| WO | WO2010128369 | A1 | 11/2010 |
| WO | WO 2010/140882 | A1 | 12/2010 |
| WO | WO 2010140882 | * | 12/2010 |
| WO | WO2011073141 | A1 | 6/2011 |
| WO | WO2012057060 | A1 | 5/2012 |
| WO | WO2014016318 | A1 | 1/2014 |
| WO | WO 2014/063993 | A1 | 5/2014 |
| WO | WO2014063993 | A1 | 5/2014 |
| WO | WO2015065393 | A1 | 5/2015 |

OTHER PUBLICATIONS

Notice of Opposition issued by the European Patent Office for patent EP3481891B1, mail date Jan. 25, 2021, 29 pages. Opposition filed by Synthos SA/PL.

Chemtura Corporation Flame Retardants Product Guide for Great Lakes Solutions, "Product_Guide_Great_Lakes_Solutions_2013", published Apr. 1, 2013 [cited Jan. 11, 2021], 9 pages. Available from www.greatlakes.com.

ICL Industrial Products, "ICL_Flame_Retardants_Brochure", published Jul. 1, 2013 [cited Jan. 11, 2021], 20 pages. Available from www.iclfr.com.

Office Action issued by CNIPA for Chinese patent application 2017800425357, dated Jan. 12, 2021, 8 pages. Translation in English is provided.

Office Action issued by Japan Patent Office for Japanese patent application 2018-555600, dated Jun. 1, 2021, 3 pages. English translation included alongside text of Office action.

Hearing Notice issued by Intellectual Property India for Indian patent application 201817039859 dated Aug. 16, 2021, 4 pages. Translation included within Hearing Notice.

Office Action issued by the patent office of the Russian Federation (Federal Institute of Industrial Property) for Russian patent application 2018137260/05(061667) dated Feb. 4, 2022, 5 pages. English translation of office action is provided.

Office Action for Japanese patent application 2018-555600 issued by the Japanese Patent Office (JPO) dated Apr. 12, 2022, 4 pages English translation is provided.

* cited by examiner

EXPANDABLE COMPOSITIONS CONTAINING AROMATIC VINYL POLYMERS HAVING SELF-EXTINGUISHING PROPERTIES AND IMPROVED PROCESSABILITY

The present invention relates to expandable polymeric compositions containing vinyl aromatic polymers and/or copolymers, which have better flame retardant behavior and better processing capacity. The present invention further relates to a process for preparing the compositions described and claimed.

The present invention further relates to expandable granules containing the compositions described and claimed and expanded or extruded foam articles, containing vinyl aromatic polymers and/or copolymers also known as EPS and XPS, obtained from the further transformation of said granules.

In the present patent application, all the operating conditions included in the text must be considered as preferred conditions even if this is not specifically stated.

For the purpose of this text the term "comprise" or "include" also comprises the term "consist in" or "essentially consisting of".

For the purpose of this text the definitions of the intervals always comprise the extremes unless specified otherwise.

For the purpose of the present description, all the compositions as described and claimed are included wherein the percentages of the components and compositions described and claimed are chosen so that their sum is always less than or equal to 100%.

The expanded polystyrene heat insulated slabs intended for the perimeter insulation of buildings must pass the flame retardant test according to standard DIN 4102-B2, for the purpose of guaranteeing safe conditions on the site, during installation of the aforementioned slabs on the exterior surfaces of buildings. For the purpose of giving flame retardant properties to expanded polystyrene items, organo-bromine compounds are usually introduced into the polymer which act as flame retardants. For many years, hexabromocyclododecane has represented the main flame retardant, used industrially by all the main self-extinguishing expandable polystyrene manufacturers.

During the development of polystyrene foams containing high performance, latest generation athermanous agents, it has been observed that carbon substances introduced into the polymer as athermanous agents significantly accelerate the brominated flame retardant degradation process, with the consequent release of significant quantities of hydrobromic acid.

The expandable granules of polystyrene with reduced thermal conductivity contain micrometric or nanometric particles of athermanous agents that attenuate the propagation of heat. Unfortunately, athermanous agents such as carbon coke, graphite and carbon black, significantly accelerate the degradation of the different types of flame retardants with the consequent release of hydrobromic acid, particularly when the flame retardant is hexabromocyclododecane. The development of hydrobromic acid is responsible for corrosion on the production plants of expandable polystyrene compositions (also in the form of granules), with the consequent deterioration of the metal parts and worsening of the behavioral and transformation characteristics of the expanded polystyrene. For example, the expandability of said compositions is worsened. To overcome these problems, in polymeric compositions containing vinyl aromatic polymers and/or copolymers, organo-bromine compounds have been used as flame retardants, such as derivatives of Tetrabromobisphenol A: for example, tetrabromobisphenol A bis-2,3 dibromopropylether as described in WO 2014/063993. These organo-bromine compounds have greater thermal stability, but are unfortunately less efficient and must therefore be dosed in higher quantities in order to continue guaranteeing the flame retardant properties to the polymeric compositions and hence allowing the fire test to be passed.

U.S. Pat. No. 4,542,164 describes a polyolefin foam with reduced flammability containing epoxy resins as flame retardants, which contain the brominated bisphenol A molecule and cross-linked products thereof.

U.S. Pat. No. 5,216,059 describes a flame retardant additive that can be used for polyolefin polymeric compositions. Said additive is a mixture of two flame retardants: a halogenated derivative of bisphenol, such as tetrabromobisphenol A bis (dibromopropyl ether), and a copolymer of a halogenated vinyl aromatic copolymer, such as bromostyrene grafted onto certain polymers, such as polypropylene.

U.S. Pat. No. 5,717,001 describes flame-retardant polystyrene compositions that contain halogenated flame retardants and zeolite A based heat stabilizers. The flame retardants used are hexabromocyclododecane and Tetrabromobisphenol A bis(dibromopropyl ether). WO 01/29124 describes a flame retardant additive that can be used in polymeric compositions based on vinyl aromatic polymers, preferably HIPS. The additive comprises a heat sensitive organo-bromine flame retardant chosen from a flame retardant compound that has a plurality of bromine atoms directly linked to a cycloaliphatic ring; the compound bis(2,3-dibromopropyl ether) of Tetrabromobisphenol-A; the compound bis(2,3-dibromopropyl ether of Tetrabromobisphenol-S. The additive further comprises from 0.01 to 0.08 parts by weight of a mercapto alcanoate alkyltin compound and from 0.01 to 0.35 parts by weight of a zeolite, the quantities being calculated for each part of the flame retardant compound.

WO 2010/140882 describes an expandable polystyrene in the form of particulate containing a flame retardant and with improved flame retardant properties. Organo-bromine compounds derived from bisphenol A, including, for example, Tetrabromobisphenol A bis-dibromopropyl ether, can be used as synergistic agents. The flame retardant used is brominated polystyrene.

EP 2495277 describes polystyrene granules with flame retardant properties that contain a flame retardant and a blowing agent. The flame retardant contains no more than 70% by weight of bromine, has a benzene ring in the molecule, has thermal degradation kinetics such that a 5% weight loss is recorded in the temperature range comprised between 200 and 300° C., a ratio between quantities of flame retardant contained in the totality of the expandable polystyrene granules and the quantity of flame retardant contained in the surface of said granules that ranges from 0.8 to 1.2. The flame retardants used are derivatives of Tetrabromobisphenol A, such as Tetrabromobisphenol A-bis(2,3-dibromo-2-methylpropyl ether), Tetrabromobisphenol A-bis (2,3-dibromopropyl ether), and Tetrabromobisphenol A-bis (allyl ether).

U.S. Pat. No. 6,780,348 describes an additive for thermoplastic polymers that acts as a thermal stabilizer. Said additive comprises a mixture with specific proportions of at least one Tetrabromobisphenol A-bis(bromo-alkyl ether) containing at least one of the following compounds: polybromodiphenylalkane wherein the phenyl groups are substituted by a total of at least 6 bromine atoms per molecule and wherein the alkane contains from 1 to 3 carbon atoms; an oxide of polybromodiphenyl wherein the phenyl groups are substituted by a total of at least 6 bromine atoms per molecule; or mixtures thereof.

Laboratory tests have highlighted that by using mixtures of flame retardants in polymeric compositions containing vinyl aromatic polymers and/or copolymers, it is also possible to significantly reduce the quantity of flame retardant necessary to guarantee that products or articles that contain these compositions pass the fire test.

The use of said flame retardant mixtures has also allowed expandable polymeric compositions containing vinyl aromatic polymers and/or copolymers to be obtained, which have a higher degree of expandability with respect to what has been observed in expandable polystyrene compositions containing a single brominated flame retardant. In the present patent application expandability means the property of expandable polymeric compositions, containing vinyl aromatic polymers and/or copolymers and a blowing agent, to reach a minimum density of the expanded item in first expansion, when subjected to an expansion process that envisages the introduction of said compositions into a pre-expander where said compositions come into contact with water vapor having a temperature of at least 100° C. The density is provided by the ratio between the mass and the volume of the expanded items: after defining the volume of the expanded item, it is weighed with a scale. The degree of expandability is therefore obtained by measuring the minimum density reachable by a composition of vinyl aromatic polymers also in the form of granules.

Therefore the subject matter of the present patent application is an expandable polymeric composition comprising:
a) a polymeric matrix containing vinyl aromatic polymers and/or copolymers;
b) from 0.1% to 20% by weight, calculated on the polymeric matrix (a), of an athermanous agent;
c) from 0.01% to 10% by weight, calculated on the polymeric matrix (a), of at least one non-polymeric brominated flame retardant additive;
d) from 0.01% to 10% by weight, calculated on the polymeric matrix (a), of at least one brominated polymer containing at least 50% bromine;
e) from 0.01% to 5% by weight, calculated on the polymeric matrix (a), of a synergistic flame retardant additive;
f) from 1% by weight to 10% by weight of at least one blowing agent.

Said compositions may be granulated with appropriate equipment hence forming expandable polymeric granules which are also the subject matter of the present patent application.

The concentrations of hydrobromic acid detected by analyzing the expandable polymeric compositions according to the present patent application were not critical or such as to create corrosion problems in the production plants.

By exploiting the combined action of two or more organo-bromine flame retardants, a continuous mass polystyrene composition production plant may be run even setting relatively high temperatures, without thereby observing any significant bromine compound degradation phenomena leading to the release of highly corrosive hydrobromic acid.

These advantages are obtained by exploiting in the compositions described and claimed, with the respective percentages described and claimed, all the binary or ternary combinations of the flame retardants chosen from a non-polymeric brominated flame retardant additive and at least one brominated polymer containing at least 50% bromine. Even more marked advantages are obtained by preferably exploiting all the binary or ternary combinations between Tetrabromobisphenol A-bis(2,3-dibromo-2-methylpropyl-ether), Tetrabromobisphenol A-bis(2,3-dibromopropyl ether), or a brominated styrene/butadiene block copolymer, such as the commercial product Emerald Innovation 3000.

Therefore the compositions described and claimed have the primary effect of limiting the thermal degradation of flame retardants and, as a direct consequence, allow greater freedom of choice of the operating parameters of the production process.

By being able to run a continuous mass plant at higher temperatures, the dispersion of flame retardants in the polymeric matrix can improve and this aspect can determine a reduction in the concentration of organo-brominated flame retardants necessary for guaranteeing that the fire test is passed.

DETAILED DESCRIPTION

The Applicant now describes in detail the polymeric compositions according to the present patent application.

The present invention relates to an expandable polymeric composition comprising:
a) a polymeric matrix containing vinyl aromatic polymers and/or copolymers;
b) from 0.1% to 20% by weight, calculated on the polymeric matrix (a), of an athermanous agent;
c) from 0.01% to 10% by weight, calculated on the polymeric matrix (a), of at least one non-polymeric brominated flame retardant additive;
d) from 0.01% to 10% by weight, calculated on the polymeric matrix (a), of at least one brominated polymer containing at least 50% bromine;
e) from 0.01% to 5% by weight, calculated on the polymeric matrix (a), of a synergistic flame retardant additive;
f) from 1% by weight to 10% by weight of at least one blowing agent.

In the present text the brominated polymers included in the compositions and the processes described and claimed are flame retardants.

Vinyl aromatic polymers that can be used in the compositions according to the present patent application are the polymers obtained by homo- or copolymerization of vinyl aromatic monomers having general formula (I):

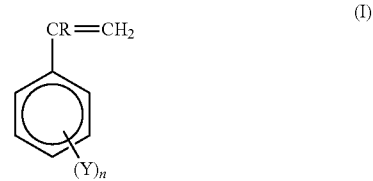

In the formula, R is a hydrogen or a methyl group; n is zero or an integer from 1 to 3; Y is chosen from a halogen, preferably chlorine or bromine; a chloromethyl; an alkyl or alkoxy group having from 1 to 3 carbon atoms.

Preferred vinyl aromatic monomers having formula (I) are chosen from styrene, α-methylstyrene, vinyltoluene isomers, ethylstyrene isomers, propylstyrene isomers, chlorostyrene isomers, methylchlorostyrene isomers, methoxystyrene isomers, acetoxystyrene isomers, hydroxystyrene isomers, methylhydroxystyrene isomers and mixtures thereof. Styrene and α-methylstyrene are more preferred.

The copolymers that may be used in the compositions according to the present patent application are obtained starting from vinyl aromatic monomers having formula (I) and vinyl comonomers. Preferred vinyl comonomers are chosen from dienes, nitriles, alkyl ethers having from 1 to 8 carbon atoms and derivatives of acrylic or methacrylic acid, vinyl acetate, and mixtures thereof. Preferred mixtures of vinyl comonomers are selected from styrene-butadiene, styrene-isoprene, hydrogenated styrene-butadiene, hydrogenated styrene-isoprene, styrene-acrylonitrile, styrene-alkyl acrylate, styrene-alkyl methacrylate, styrene-butadiene-alkyl acrylate, styrene-butadiene-alkyl methacrylate, styrene-acrylonitrile-alkyl acrylate, styrene-vinyl acetate.

The brominated flame retardant additives that can be used in the compositions described and claimed are preferably Bisphenol A derivatives. More preferably they are chosen from Tetrabromobisphenol A bis (2,3 dibromopropylether) (commercial product PE68 and having CAS number 21850-44-2), Tetrabromobisphenol A Bis (2 methyl 2,3 dibromopropyl ether) (commercial product FR130 and having CAS number 97416-84-7), Tetrabromobisphenol A bis (2 hydroxyethyl) ether (having CAS number 4162-45-2), Tetrabromobisphenol A bis allyl ether (having CAS number 25327-89-3), Tetrabromobisphenol A (having CAS number 79-94-7), Tetrabromobisphenol A bis (glycidyl ether) (having CAS number 3072-84-2); and mixtures thereof.

In binary mixtures that contain the brominated flame retardant additives, the additives are preferably contained according to a weight ratio that varies in an interval comprised between 5:95 and 95:5, preferably comprised between 15:85 and 85:15, even more preferably comprised between 25:75 and 75:25.

A preferred mixture is that which comprises Tetrabromobisphenol A bis (2,3 dibromopropylether) and Tetrabromobisphenol A Bis (2 methyl 2,3 dibromopropyl ether), wherein said flame retardants are contained in the mixture in weight ratio between Tetrabromobisphenol A bis (2,3 dibromopropylether) and Tetrabromobisphenol A Bis (2 methyl 2,3 dibromopropyl ether) that varies in the interval comprised between 5:95 and 95:5; preferably comprised between 15:85 and 85:15; even more preferably between 25:75 and 75:25.

Further preferred mixtures of brominated flame retardants are those containing Tetrabromobisphenol A bis (2 hydroxyethyl) ether and Tetrabromobisphenol A bis allyl ether, wherein said flame retardants are contained according to the weight ratio between Tetrabromobisphenol A bis (2 hydroxyethyl) ether and Tetrabromobisphenol A bis allyl ether that varies in the interval comprised between 5:95 and 95:5; preferably comprised between 15:85 and 85:15; even more preferably between 25:75 and 75:25. Further preferred mixtures of brominated flame retardants are those containing Tetrabromobisphenol A and Tetrabromobisphenol A bis (glycidyl ether), wherein said flame retardants are contained according to the weight ratio between Tetrabromobisphenol A and Tetrabromobisphenol A bis (glycidyl ether) that varies in the interval comprised between 5:95 and 95:5; preferably comprised between 15:85 and 85:15; even more preferably between 25:75 and 75:25.

Brominated polymers that contain at least 50% bromine, which can be used in the compositions described and claimed, are chosen from brominated polystyrene (having CAS number 88497-56-7), copolymers based on Tetrabromobisphenol A diglycidyl ether (having CAS number 68928-70-1 and CAS number 135229-48-0), brominated polybutadiene (having CAS number 68441-46-3), and brominated styrene/butadiene block copolymers (having CAS number 1195978-93-8).

The preferred brominated styrene/butadiene block copolymer is the commercial product made by the company Great Lakes known by the commercial name of Emerald Innovation 3000. The characteristics of the brominated styrene/butadiene block copolymer are described in the product's technical data sheet (published on 18 Jun. 2012). The structural formula of the brominated styrene/butadiene block copolymer used in the present invention is indicated in (II):

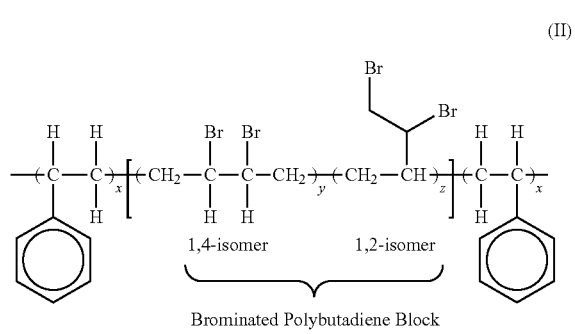

Brominated Polybutadiene Block

More information on the characteristics of the brominated styrene/butadiene block copolymer used as a flame retardant in the present invention is contained in patent WO 2007/058736.

A preferred mixture, among brominated polymers that contain at least 50% bromine, comprises brominated polystyrene and at least a copolymer Tetrabromobisphenol A 2,2 Bis [4-(2,3 epoxypropoxy)-dibromophenyl]-propane, wherein the brominated polymers are contained according to a weight ratio between brominated polystyrene and copolymer Tetrabromobisphenol A 2,2 Bis [4-(2,3 epoxypropoxy)-dibromophenyl]-propane, which varies in an interval comprised between 5:95 and 95:5, preferably comprised between 15:85 and 85:15, even more preferably comprised between 25:75 and 75:25.

A further preferred mixture, among brominated polymers that contain at least 50% bromine, comprises brominated polybutadiene and at least a brominated styrene/butadiene block copolymer, wherein the brominated polymers are contained according to a weight ratio between brominated polybutadiene and the brominated styrene/butadiene block copolymer, which varies in an interval comprised between 5:95 and 95:5, preferably comprised between 15:85 and 85:15, even more preferably comprised between 25:75 and 75:25.

A further preferred mixture, among brominated polymers that contain at least 50% bromine, comprises a brominated styrene/butadiene block copolymer a copolymer Tetrabromobisphenol A 2,2 Bis [4-(2,3 epoxypropoxy)-dibromophenyl]-propane, wherein the brominated polymers are contained according to a weight ratio between a brominated styrene/butadiene block copolymer and copolymer Tetrabromobisphenol A 2,2 Bis [4-(2,3 epoxypropoxy)-dibromophenyl]-propane, which varies in an interval comprised between 5:95 and 95:5, preferably comprised between 15:85 and 85:15, even more preferably comprised between 25:75 and 75:25.

Preferably in the compositions described and claimed the quantity of the individual non-polymeric brominated flame retardant additives varies from 0.01% to 10% by weight, more preferably from 0.1% to 4%, even more preferably from 0.15% to 3.5%, even more preferably from 0.2% to 2.3%, and is calculated on the polymeric matrix (a). Preferably in the compositions described and claimed the quantity of the individual brominated polymers varies from 0.01% to 10% by weight; preferably from 0.1% to 4%, even more preferably from 0.2% to 2.5%, even more preferably from 0.25% to 0.8%, and is calculated on the polymeric matrix (a).

Preferably in the compositions described and claimed, the non-polymeric brominated flame retardant additive is Tetrabromobisphenol A bis (2 hydroxyethyl) ether, and the brominated polymer that contains at least 50% bromine is at least a brominated styrene/butadiene block copolymer.

Also preferred are the compositions described and claimed wherein the non-polymeric brominated flame retardant additive is Tetrabromobisphenol A bis (2 hydroxyethyl) ether and its quantity varies from 0.01 to 10% by weight, preferably from 0.1% to 4%, even more preferably from 0.15% to 3.5%, even more preferably from 0.2% to 2.3%; and the brominated polymer that contains at least 50% bromine is at least a brominated styrene/butadiene block copolymer and its quantity varies from 0.01 to 10% by weight, preferably from 0.1% to 4%, even more preferably from 0.2% to 2.5%, even more preferably from 0.25% to 0.8%.

Preferably in the compositions described and claimed, the non-polymeric brominated flame retardant additive is Tetrabromobisphenol A bis allyl ether, and the brominated polymer that contains at least 50% bromine is at least a brominated styrene/butadiene block copolymer.

Also preferred are the compositions described and claimed wherein the non-polymeric brominated flame retardant additive is Tetrabromobisphenol A bis allyl ether and its quantity varies from 0.01% to 10% by weight, more preferably from 0.1% to 4%, even more preferably from 0.15% to 3.5%, even more preferably from 0.2% to 2.3%; and the brominated polymer that contains at least 50% bromine is at least a brominated styrene/butadiene block copolymer and its quantity varies from 0.01% to 10% by weight, preferably from 0.1% to 4%, even more preferably from 0.2% to 2.5%, even more preferably from 0.25% to 0.8%, and is calculated on the polymeric matrix (a). Preferably in the compositions described and claimed, the non-polymeric brominated flame retardant additive is a binary mixture that comprises Tetrabromobisphenol A bis (2,3 dibromopropylether) and Tetrabromobisphenol A Bis (2 methyl 2,3 dibromopropyl ether), and simultaneously the brominated polymer that contains at least 50% bromine is at least a brominated styrene/butadiene block copolymer.

Preferably in the compositions described and claimed, the non-polymeric brominated flame retardant additive is a binary mixture that comprises Tetrabromobisphenol A bis (2,3 dibromopropylether) and Tetrabromobisphenol A Bis (2 methyl 2,3 dibromopropyl ether); and simultaneously the brominated polymer that contains at least 50% bromine is a brominated styrene/butadiene block copolymer; in said composition the brominated additives being contained in the binary mixture according to a weight ratio between Tetrabromobisphenol A bis (2,3 dibromopropylether) and Tetrabromobisphenol A Bis (2 methyl 2,3 dibromopropyl ether that varies in an interval comprised between 5:95 and 95:5, preferably comprised between 15:85 and 85:15, even more preferably comprised between 25:75 and 75:25; while the brominated styrene/butadiene block copolymer being contained in the composition in a concentration greater than or equal to 5% by weight, preferably greater than or equal to 10% by weight; a percentage calculated with respect to the sum of the three flame retardants contained in said composition.

In a further preferred embodiment, the present invention relates to the compositions as described and claimed wherein the non-polymeric brominated flame retardant additive is a binary mixture comprising Tetrabromobisphenol A bis (2,3 dibromopropylether), Tetrabromobisphenol A Bis (2 methyl 2,3 dibromopropyl ether), and simultaneously the brominated polymer is brominated polybutadiene; in said composition the brominated additives being contained in the binary mixture according to a weight ratio that varies in an interval comprised between 5:95 and 95:5, preferably comprised between 15:85 and 85:15, even more preferably comprised between 25:75 and 75:25, while the brominated polybutadiene is contained in a concentration greater than 5% by weight, preferably greater than 10% by weight; a percentage calculated with respect to the weight of the three flame retardants (polymeric and/or non-polymeric) contained in the expandable polymeric composition described and claimed.

In a preferred embodiment the present invention relates to a polymeric composition comprising:
a) a polymeric matrix based on vinyl aromatic polymers;
b) from 0.1% to 20% by weight, calculated on the polymeric matrix (a), of an athermanous agent;
c) from 0.01% to 10% by weight, more preferably from 0.1% to 4%, even more preferably from 0.15% to 3.5%, even more preferably from 0.2% to 2.3%, calculated on the polymeric matrix (a), of Tetrabromobisphenol A bis 2,3 dibromopropylether;
d) from 0.01% to 10% by weight; preferably from 0.1% to 4%, even more preferably from 0.2% to 2.5%, even more preferably from 0.25% to 1%, calculated on the polymeric matrix (a), of at least a brominated styrene/butadiene block copolymer containing at least 50% bromine;
e) from 0.01% to 5% by weight, calculated on the polymeric matrix (a), of a synergistic flame retardant additive.
f) from 1% by weight to 10% by weight of at least one blowing agent.

In a preferred embodiment the present invention relates to a polymeric composition comprising:
a) a polymeric matrix based on vinyl aromatic polymers;
b) from 0.1% to 20% by weight, calculated on the polymeric matrix (a), of an athermanous agent;
c) from 0.01% to 10% by weight, more preferably from 0.1% to 4%, even more preferably from 0.15% to 3.5%, even more preferably from 0.2% to 2.3%, calculated on the polymeric matrix (a), of Tetrabromobisphenol A bis 2,3 dibromopropylether;
d) from 0.01% to 10% by weight; preferably from 0.1% to 4%, even more preferably from 0.2% to 2.5%, even more preferably from 0.25% to 0.8%, calculated on the polymeric matrix (a), of a brominated styrene/butadiene block copolymer containing at least 50% bromine;
e) from 0.01% to 10% by weight, more preferably from 0.1% to 4%, even more preferably from 0.15% to 3.5%, even more preferably from 0.2% to 2.3%, calculated on the polymeric matrix (a), of Tetrabromobisphenol A bis 2 methyl-2,3 dibromopropylether;
f) from 0.01% to 5% by weight, calculated on the polymeric matrix (a), of a synergistic flame retardant additive;
g) from 1% by weight to 10% by weight of at least one blowing agent.

The compositions described and claimed in the present text may preferably comprise from 2.5% to 8% by weight, even more preferably from 3% to 7% by weight, of at least a blowing agent, a quantity calculated with respect to the polymeric matrix (a).

Any blowing agent able to be incorporated into a polymer can be used in the compositions according to the present patent application. Preferably the blowing agents may be liquid substances with a boiling point that varies between 10° C. and 100° C. at atmospheric pressure; preferably between 20° C. and 60° C. Blowing agents that can be used in the present invention are chosen from aliphatic or cyclo-aliphatic hydrocarbons containing from 3 to 6 carbon atoms; for example n-pentane, iso-pentane, cyclo pentane, butane, isobutane and mixtures thereof; or halogenated derivatives of aliphatic hydrocarbons containing from 1 to 3 carbon atoms, such as dichlorodifluoromethane, 1,2,2-trifluoroethane and 1,1,2-trifluoroethane; or carbon dioxide.

For the purpose of promoting the retention of the blowing agent in the polymeric matrix (a), additives can be used that are able to form weak bonds (e.g. hydrogen bridges) or strong bonds (e.g. acid-base adducts) with the blowing agent. Preferably said additives are chosen from methyl alcohol, isopropyl alcohol, dioctyl phthalate, dimethyl carbonate, derivatives containing an amine group.

The compositions according to the present invention may comprise a variable quantity from 0.01% by weight to 5% by weight, calculated on the polymeric matrix (a), of synergistic flame retardant additives, preferably from 0.05% to 1%, more preferably from 0.1% to 0.5% by weight. A synergistic agent is defined as a substance able to generate radicals that induce the degradation of the halogenated flame retardant agent with the formation of halogen radicals at the flame temperature. Said synergistic additive may preferably be chosen from a peroxide or an unstable hydrocarbon. More preferably, the synergistic additive is chosen from dicumyl peroxide, 2,3-dimethyl-2,3-diphenylbutane, 3,4-dimethyl-3,4-diphenylhexane, 3,6,9-triethyl-3,6,9-trimethyl-1,4,7-triperoxynonane. Preferred synergistic additives are dicumylperoxide, when the polymeric compositions described and claimed are produced with a polymerization process in aqueous suspension; 2,3-dimethyl-2,3-diphenylbutane when the compositions described and claimed are produced through a continuous mass polymerization process.

The composition described and claimed in the present patent application may preferably comprise a variable quantity from 0.5% by weight to 15% by weight, calculated on the polymeric matrix (a), of an athermanous additive; even more preferably from 1% by weight to 7% by weight.

An athermanous additive is a compound that has the function of making a body opaque to calorific rays and therefore making it an insulating body. Athermanous agents suitable for the purposes of the present invention are chosen from carbonaceous compounds, preferably coke, carbon black or graphite. Among cokes, petroleum coke, calcined petroleum coke, needle coke and mixtures thereof are preferred. Among graphites, natural graphite, synthetic graphite, expanded graphite and mixtures thereof are preferred. The preferred athermanous agent is coke, and in particular petroleum coke, more in particular calcined petroleum coke or needle coke.

In the polymeric compositions described and claimed in the present text, carbon black may be present in quantities comprised between 0.1% and 20% by weight, preferably between 0.5% and 15% by weight, more preferably between 1% and 7% by weight, said quantity being calculated on the polymeric matrix (a).

In the polymeric compositions described and claimed in the present text, graphite may be present in quantities comprised between 0.1% and 20% by weight, preferably between 0.5% and 15% by weight, more preferably between 1% and 7% by weight, the quantity being calculated on the polymeric matrix (a).

In the polymeric compositions described and claimed in the present text, carbon coke (or simply coke) may be present in quantities comprised between 0.1% by weight and 20% by weight, more preferably between 0.5% by weight and 15% by weight, even more preferably between 1% by weight and 7% by weight, calculated on the polymeric matrix (a).

The coke used in the compositions described and claimed in the present text, is presented as a finely divided powder with a particle size ($D_{90}$) comprised from 0.2 micron to 100 micron, preferable from 1 micron to 40 micron, more preferably from 2 micron to 20 micron.

The coke particle size ($D_{90}$) is measured with a Malvern 2000 Laser particle size analyzer damp, and the measurement is performed according to the indications of method ISO 13320: during the measurement, the coke particles are dispersed in distilled water and then measured. The meaning of the dimensional value $D_{90}$ is as follows: it is the value of the particle diameter, expressed in micrometers, below which 90% of the population in volume of the particles of powder analyzed are found. Diameter means the size of the particle measured with the Malvern 2000 type laser particle size analyzer damp, and the measurement is performed according to the indications of method ISO 13320.

The coke used in the compositions described and claimed in the present text may have a surface area comprised from 5 $m^2/g$ to 200 $m^2/g$, preferably from 8 $m^2/g$ to 50 $m^2/g$, measured according to ASTM D-3037-89 and indicated in the present text as BET. The characteristics of the coke indicated in the present text are also valid for petroleum coke; in particular, for calcined petroleum coke or calcined coke and needle coke. Coke is produced by pyrolysis of organic material, and passes, at least in part, through a liquid or liquid-crystalline state during the carbonization process. Preferably, the organic starting material is petroleum, coal or lignite.

More preferably, the coke used in the preparation of the polymeric compositions according to the present invention is the product of the carbonization of the high-boiling point hydrocarbon fraction coming from the distillation of petroleum, conventionally known as a heavy residual fraction. In particular, coke is obtained starting from coking the heavy residual fraction, an operation performed at high temperatures that again produces some light fractions and a solid (petroleum coke). The petroleum coke thus obtained is calcined at a temperature comprised between 1000° C. and 1600° C. (calcined coke). If a heavy residual fraction is used rich in aromatic components, after calcination and micro-grinding, a needle coke is formed.

More information on the characteristics of the different types of coke that can be used in the present invention, production and characterization methods of the different grades commercially available (green coke, coal-derived pitch coke, delayed coke, fluid coke, needle coke, premium coke, calcined coke) are available online, on the website "goldbook.iupac.org" or in "Pure Appl. Chem., 1995, Vol. 67, N. 3, pages 473-506, Recommended terminology for the description of carbon as a solid (IUPAC Recommendations 1995)".

The athermanous agent carbon black has a diameter ($D_{90}$), measured using the Malvern 2000 laser particle size analyzer damp according to method ISO 13320. The measurement of the carbon black particle size is performed according to the methods previously described. The carbon black particles have a $D_{90}$ that varies between 30 nm and 1000 nm, preferably between 40 nm and 500 nm.

The graphite is in the form of particles that can have a size ($D_{90}$), measured with a Malvern 2000 type laser particle size analyzer damp according to method ISO 13320 as previously described for the same measurement with respect to other athermanous agents: the particles of graphite have a $D_{90}$ that varies from 0.05 μm to 100 μm, preferably from 1 μm to 20 μm, with a surface area that varies from 5 m²/g to 50 m²/g, measured according to ASTM D-3037-89 and also indicated as BET.

Further additives may be added to the compositions according to the present invention (generally introduced into traditional vinyl aromatic polymers) such as nucleating agents, e.g. polyethylene waxes or talc, antioxidant agents, pigments, stabilizing agents, antistatic agents and release agents. Additives may also be dosed that are able to neutralize the acids released due to the decomposition of the halogenated compounds introduced into the polymeric mass as flame retardants. The additives with neutralizing action that can be used in the present invention may include basic substances of an inorganic nature such as CaO, $Ca(OH)_2$, MgO, $Mg(OH)_2$, $Al_2O_3$, $Al(OH)_3$ and organic compounds containing epoxy functional groups, compounds containing amine groups.

The polymeric compounds described and claimed in the present patent application may be realized through a suspension process that envisages the dissolution and/or dispersion of the athermanous additive, the flame retardant additives or mixtures thereof, and any further additives in the vinyl aromatic monomer and/or comonomer. Once the suspension has been prepared, the polymerization in aqueous suspension begins, during which a blowing agent is added.

The polymeric compositions described and claimed in the present patent application may also be realized with a polymerization process in aqueous suspension or through a resuspension process of the polymeric granules in the aqueous phase.

The polymerization process in aqueous solution may be performed using inorganic salts of phosphoric acid, more preferably magnesium tricalcium phosphate or phosphate/pyrophosphate. Said inorganic salts of phosphoric acid may be added to the polymerization mixture already finely divided or may be synthesized in situ by reaction, for example, between sodium pyrophosphate and magnesium sulfate.

The polymerization may also be performed in the presence of further organic suspending agents such as hydroxyethylcellulose, polyvinylpyrrolidone or polyvinyl alcohol. The initiator system used in the polymerization process in aqueous suspension, described and claimed in the present text comprises two peroxides, the first having a half-value time of an hour at 85-95° C. and the other having a half-value time of an hour at 110-120° C. Examples of such initiators are tert-Butyl peroxy-2-ethylhexanoate and Tert-Butyl peroxy 2 ethylhexylcarbonate (Trigonox 117-Akzo).

The self-extinguishing expandable composition of polymers and/or copolymers obtained has an average molecular weight MW comprised between 50000 and 300000, preferably between 70000 and 220000. In general, more details on processes for the preparation of expandable vinyl aromatic polymers or copolymers in aqueous solution or, more generally, on polymerization in suspension can be found in the Journal of Macromolecular Science, Review in Macromolecular Chemistry and Physics C31 (263) 215-299 (1991).

For the purpose of increasing the stability of the suspension, it is possible to increase the viscosity of the reagent solution, comprising the monomer, by dissolving vinyl aromatic polymer in the suspension, in a concentration comprised between 1% and 30% by weight, preferably comprised between 5% and 20%, calculated on the monomer only. The solution can be obtained by dissolving a preformed polymer (e.g. fresh polymer or scraps from previous polymerizations and/or expansions) in the reagent mixture or by pre-polymerizing in mass the monomer, or mixture of monomers, until the previously mentioned concentrations are obtained, and then continuing the polymerization in aqueous suspension.

During polymerization in suspension, further polymerization additives are used, typically used for producing expandable vinyl aromatic polymers, such as suspension stabilizing agents, chain transfer agents, expansion adjuvants, nucleating agents, plasticizers and anti-flame agents.

Furthermore, during polymerization in suspension, organo-brominated, organo-chlorinated compounds or halogenated polymers may be dosed, for the purpose of imparting flame retardant properties to the expanded items obtained for the transformation of the expandable granules.

In the polymerization process in aqueous suspension, the blowing agents are preferably added during the polymerization step, or subsequently through re-suspension technology. The blowing agents are chosen from aliphatic or cyclo-aliphatic hydrocarbons containing from 3 to 6 carbon atoms such as n-pentane, iso-pentane, cyclo-pentane and mixtures thereof; halogenated derivatives of aliphatic hydrocarbons containing from 1 to 3 carbon atoms, such as, dichlorodifluoromethane, 1,2,2-trifluoroethane, 1,1,2-trifluoroethane; carbon dioxide and water.

At the end of the polymerization process in aqueous suspension, possibly at the end of the re-suspension, substantially spherical granules of polymer are obtained with an average diameter comprised between 0.2 mm and 3 mm. Said expandable granules contain the compositions described and claimed in the present patent application in all its preferred forms.

Inside the expandable granules the blowing agents and any additives are uniformly dispersed.

The expandable granules are then unloaded from the polymerization reactor and washed, continuously or discontinuously with non-ionic surfactants or, alternatively, with acids, as described in U.S. Pat. No. 5,041,465. The polymer granules may be heat treated with air at a temperature comprised between 20° C. and 60° C.

The polymeric compositions described and claimed in the present patent application may also be realized through a continuous mass process that envisages the following steps in sequence:

i. mixing a vinyl aromatic polymer and/or copolymer in granule or powder form or already in the molten state with an athermanous additive, as such or in master-batch form (which is commonly known as concentrated composition), and any further additives, to form a polymeric mixture;

ii. possibly, if not already in the molten state, bringing the polymeric mixture to a temperature above the melting point of the vinyl aromatic polymer;

iii. incorporating in the polymeric molten mixture at least one blowing agent, flame retardant additives or mixtures thereof, and any further additives, forming a vinyl aromatic polymeric composition;

iv. mixing the polymeric composition thus obtained by means of static or dynamic mixing elements;

v. sending the polymeric composition after mixing to a cutting chain under pressure.

A cutting chain used is for example the one described in U.S. Pat. No. 7,320,585 with a "Spraying Nozzles System". The expandable granules according to the present invention may also be produced with a different type of chain, where the polymer is cut in a granulation chamber full of water, a system known as "underwater cutting". In this case, during the cutting step, the polymer remains completely immersed in water, and the water pressure in the granulation chamber is greater than 3 bar.

At the end of the continuous mass process, the compositions obtained are in the form of spheroidal shaped polymer granules with an average diameter comprised between 0.2 and 3 mm.

Inside the expandable granules produced through the continuous mass production process, the blowing agents, athermanous agents, flame retardants and any additive are uniformly dispersed in the polymer.

The polymeric compositions described and claimed in the present patent application may also be realized through a direct extrusion process. According to said process, athermanous additives as such or in master-batch form, flame retardant additives or mixtures thereof, as such or in master-batch form, flame retardant additives or mixtures thereof, as such, or in master-batch form and at least one blowing agent are fed directly to a mixture of polymer and/or copolymer granules.

The compositions described and claimed in the present patent application allow a significant reduction of the dose of brominated flame retardants introduced into the polymeric matrix for the purpose of making expanded polystyrene items fireproof, as can be seen in the comparison between the comparative examples and the examples of the invention described below.

The dosage of said compositions has also determined a considerable improvement of the degree of expandability of products containing athermanous charges. In fact, expanded items produced using the flame retardant mixtures according to this invention have reached lower minimum density values than what has been observed using individual flame retardants as can be observed in the comparison between the comparative examples and examples 1-3 of the invention. The same examples show a sensitive reduction of the quantity of hydrobromic acid contained in the expandable granules, produced due to the degradation suffered by the organo-brominated compounds. Some demonstrative examples are provided below for the better understanding of the invention and of the scope of application. Such examples do not constitute in any way a limitation to the scope of the present invention.

Comparative Example 1 (Continuous Mass Process)

40.1 parts of polystyrene N1782; 3 parts of SAN sold by Versalis as Kostil B 855 (containing 15% acrylonitrile with MFI=5 g/10 minutes at 200° C.-5 Kg); and 56.9 parts of calcined carbon coke 4287 Asbury are mixed in a twin-screw extruder. The extruded product is used as concentrated material, in the production of expandable composites according to the present invention.

89.8 parts of ethylbenzene, 786.2 parts of styrene, 0.2 parts of divinylbenzene and 123.8 parts of the concentrate prepared as above are fed into an agitated reactor and dissolved for a total of 1000 parts. The reaction is performed at 125° C. with an average residence time of 2 hours. The fluid composition at the outlet is then fed to a second reactor where the reaction is completed at 135° C. with an average residence time of 2 hours.

The reactive polymeric composition, having a 72% conversion, is heated to 240° C. and then fed to the devolatilizer to remove the solvent and the residual monomer. The resulting composition has a glass transition temperature of 101° C., a melt flow index (MFI 200° C., 5 kg) of 9 g/10', a molecular weight MW of 190000 g/mol and a MW/Mn ratio of 2.8, where MW is the weight-average molecular weight and Mn is the number-average molecular weight.

The vinyl aromatic composition is collected in a heated tank and fed to a heat exchanger for lowering its temperature to 200° C.

125.9 parts of polystyrene N2982, 21 parts of HP 900 (hexabromocyclododecane having CAS number 3194-55-6, sold by the company Albemarle) and 3.1 parts of Perkadox 30® (2,3-dimethyl-2,3-diphenylbutane, sold by Akzo Nobel), for a total of 150 parts are fed into a twin-screw extruder. A gear pump increases the supply pressure of the molten additive to 260 barg. 50 parts of a mixture of n-pentane (70%) and iso-pentane (30%) are then pressurized and injected to the supply of the additive. The mixing is completed through static mixers, at a temperature of about 200° C.

The composition thus mixed is added to 850 parts of the vinyl aromatic composition coming from the heat exchanger. The ingredients are then mixed through static mixing elements for a calculated average (residence) time of 7 minutes. The composition is then distributed to the chain, where it is extruded through a number of holes having a diameter of 0.5 mm, immediately cooled with a jet of water and cut with a series of rotating knives (according to USA patent no. 2005/0123638). The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is prepared by adding to the above 1.5 parts of glyceryl monostearate, 1 part of glyceryl tristearate, 1 part of zinc stearate and 0.2 parts of polysorbate 80 (sold by the company Croda with the commercial name Crillet 4 Super) for 1000 parts of dried granulated pearls. The coating additives are mixed with the granulate through a continuous screw mixer. The size of the expandable granules subjected to the expansion process is comprised between 0.9 and 1.6 mm.

The product has been pre-expanded in a discontinuous pre-expander produced by the company AMD, model P125 D (useful volume at level: 125 liters), using steam at the temperature of 100° C. The pressure of the steam used for the pre-expansion of the polymeric granules was set at 0.1 bar. The quantity of expandable granules fed to the pre-expander is 1000 g. The expanded pearls were left to mature for 12 hours and then used for molding blocks (dimensions 1040 mm×1030 mm×550 mm).

Some slabs obtained from the block of expanded material are placed in the oven at 70° C. for 2 days (residual pentane less than 0.15%): then the samples (9 cm×19 cm×2 cm) are obtained for the fire behavior test according to standard DIN 4102-B2. The samples pass the test. The thermal conductivity was 30.6 mW/mK (measured according to method ISO 8301). The density of the expanded slabs is 17.0 g/l. The expandable granules contain 2150 ppm of hydrobromic acid.

Comparative Example 2 (Continuous Mass Process)

40.1 parts of polystyrene N1782; 3 parts of SAN sold by Versalis as Kostil B 855 (containing 15% acrylonitrile with MFI=5 g/10 minutes at 200° C.-5 Kg); and 56.9 parts of calcined carbon coke 4287 Asbury used in example 1 are mixed in a twin-screw extruder. The extruded product is used as concentrated material, in the production of expandable composites according to the present invention.

In an agitated reactor 89.8 parts of ethylbenzene, 786.2 parts of styrene and 0.2 parts of divinylbenzene are fed to an agitated reactor. 123.8 parts of the concentrate prepared as above are fed to the reactor and dissolved for a total of 1000 parts. The reaction is performed at 125° C. with an average residence time of 2 hours. The fluid composition at the outlet is then fed to a second reactor where the reaction is completed at 135° C. with an average residence time of 2 hours.

The reactive polymeric composition, having a 72% conversion, is heated to 240° C. and then fed to the devolatilizer to remove the solvent and the residual monomer. The resulting composition has a glass transition temperature of 101° C., a melt flow index (MFI 200° C., 5 kg) of 9 g/10', a molecular weight MW of 190000 g/mol and a MW/Mn ratio of 2.8, where MW is the weight-average molecular weight and Mn is the number-average molecular weight.

The vinyl aromatic composition is collected in a heated tank and fed to a heat exchanger for lowering its temperature to 200° C.

109.1 parts of polystyrene N2982, 37.8 parts of tetrabromobisphenol A 2,3 dibromopropyl ether (CAS 21850-44-2) and 3.1 parts of Perkadox 30® (2,3-dimethyl-2,3-diphenylbutane, sold by Akzo Nobel), for a total of 150 parts are fed into a twin-screw extruder. A gear pump increases the supply pressure of the molten additive to 260 barg. 50 parts of a mixture of n-pentane (70%) and iso-pentane (30%) are then pressurized and injected to the supply of the additive. The mixture is completed through static mixers, at a temperature of about 200° C.

The composition thus mixed is added to 850 parts of the vinyl aromatic composition coming from the heat exchanger. The ingredients are then mixed through static mixing elements for a calculated average (residence) time of 7 minutes. The composition is then distributed to the chain, where it is extruded through a number of holes having a diameter of 0.5 mm, immediately cooled with a jet of water and cut with a series of rotating knives (according to USA patent no. 2005/0123638). The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is prepared by adding to the above 1.5 parts of glyceryl monostearate, 1 part of glyceryl tristearate, 1 part of zinc stearate and 0.2 parts of polysorbate 80 (sold by the company Croda with the commercial name Crillet 4 Super) for 1000 parts of dried granulated pearls. The coating additives are mixed with the granulate through a continuous screw mixer.

The expansion of the granulated pearls and the molding were performed as indicated in comparative example 1. Some slabs still obtained as in comparative example 1 are placed in the oven at 70° C. for 2 days (residual pentane <0.15%): then the samples (9 cm×19 cm×2 cm) are obtained for the fire behavior test according to standard DIN 4102-B2. The samples pass the test. The thermal conductivity measured on the expanded items obtained from the block was 30.6 mW/mK (according to standard ISO 8301). The density of the expanded slabs is 16.7 g/l. The expandable granules contain 290 ppm of hydrobromic acid.

Comparative Example 3 (Continuous Mass Process)

Comparative example 2 was repeated. The masterbatch with the Flame Retardant additives was prepared by feeding 124.9 g of polystyrene N2982, 22 parts of Tetrabromobisphenol A Bis (2 methyl 2,3 dibromopropyl ether) and 3.1 parts of Perkadox 30 (2,3 dimethyl diphenyl butane—Akzo Nobel) for a total of 150 parts, to the twin-screw extruder.

As reported in comparative example 2, the ingredients are then mixed through static mixing elements for a calculated average (residence) time of 7 minutes. The composition is then distributed to the chain, where it is extruded through a number of holes having a diameter of 0.5 mm, according to the methods described in comparative example 1. The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is the same one used in comparative example 1. The coating additives are mixed with the granulate through a continuous screw mixer.

The expansion of the granulated pearls and the molding were performed as in comparative example 1. Some slabs still obtained as in comparative example 1 are placed in the oven at 70° C. for 2 days (residual pentane less than 0.15%): then the samples (9 cm×19 cm×2 cm) are obtained for the fire behavior test according to standard DIN 4102-B2. The thermal conductivity measured on the expanded items obtained from blocks of expanded material was 30.8 mW/mK (measured according to method ISO 8301). The density of the expanded slabs is 16.8 g/l. The expandable granules contain 1800 ppm of hydrobromic acid.

Example 1

Comparative example 2 was repeated. The masterbatch with the Flame Retardant additives was prepared by feeding 126 g of polystyrene N2982, a mixture of flame retardants comprising 15.7 parts of tetrabromobisphenol A 2,3 dibromopropyl ether and 5.2 parts of brominated styrene/butadiene block copolymer (Emerald Innovation 3000) and 3.1 parts of Perkadox 30 (2,3 dimethyl diphenyl butane, Akzo Nobel) for a total of 150 parts, to the twin-screw extruder.

As reported in comparative example 2, the ingredients are then mixed through static mixing elements for a calculated average (residence) time of 7 minutes. The composition is then distributed to the chain, where it is extruded through a number of holes having a diameter of 0.5 mm, according to the methods described in comparative example 1. The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is the same one used in comparative example 1. The coating additives are mixed with the granulate through a continuous screw mixer.

The expansion of the granulated pearls and the molding were performed as in comparative example 1. Some slabs still obtained as in example 1 are placed in the oven at 70° C. for 2 days (residual pentane less than 0.15%): then the samples (9 cm×19 cm×2 cm) are obtained for the fire behavior test according to standard DIN 4102-B2. The samples pass the test.

The thermal conductivity measured on the expanded items obtained from a block of expanded material was 30.5 mW/mK (measured according to method ISO 8301). The density of the expanded slabs is 15.8 g/l. The expandable granules contain 250 ppm of hydrobromic acid.

Example 2

Comparative example 2 was repeated. The masterbatch with the Flame Retardant additives was prepared by feeding 126 g of polystyrene N2982, a mixture of flame retardants comprising 15.7 parts of tetrabromobisphenol A 2,3 dibromopropyl ether and 3.1 parts of brominated styrene/butadiene block copolymer (Emerald Innovation 3000), 2.1 parts of Tetrabromobisphenol A Bis (2 methyl 2,3 dibromopropyl ether) and 3.1 parts of Perkadox 30 (2,3 dimethyl diphenyl butane, Akzo Nobel) for a total of 150 parts, to the twin-screw extruder.

As reported in comparative example 2, the ingredients are then mixed through static mixing elements for a calculated average (residence) time of 7 minutes. The composition is then distributed to the chain, where it is extruded through a number of holes having a diameter of 0.5 mm, according to the methods described in comparative example 1. The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is the same one used in comparative example 1. The coating additives are mixed with the granulate through a continuous screw mixer.

The expansion of the granulated pearls and the molding were performed as described in comparative example 1. Some slabs still obtained as in comparative example 1 are placed in the oven at 70° C. for 2 days (residual pentane less than 0.15%): then the samples (9 cm×19 cm×2 cm) are obtained for the fire behavior test according to standard DIN 4102-B2. The samples pass the test.

The thermal conductivity measured on the expanded items obtained from a block of expanded material was 30.3 mW/mK (measured according to method ISO 8301). The density of the expanded slabs is 16 g/l. The expandable granules contain 280 ppm of hydrobromic acid.

Example 3

Comparative example 2 was repeated. The masterbatch with the Flame Retardant additives was prepared by feeding 124.9 g of polystyrene N2982, a mixture of flame retardants comprising 16.8 parts of tetrabromobisphenol A 2,3 dibromopropyl ether and 5.2 parts of Tetrabromobisphenol A Bis (2 methyl 2,3 dibromopropyl ether) and 3.1 parts of Perkadox 30 (2,3 dimethyl diphenyl butane, Akzo Nobel) for a total of 150 parts, to the twin-screw extruder.

As reported in comparative example 2, the ingredients are then mixed through static mixing elements for a calculated average (residence) time of 7 minutes. The composition is then distributed to the chain, where it is extruded through a number of holes having a diameter of 0.5 mm, according to the methods described in comparative example 1. The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is the same one used in comparative example 1. The coating additives are mixed with the granulate through a continuous screw mixer.

The expansion of the granulated pearls and the molding were performed as described in comparative example 1. Some slabs still obtained as in comparative example 1 are placed in the oven at 70° C. for 2 days (residual pentane less than 0.15%): then the samples (9 cm×19 cm×2 cm) are obtained for the fire behavior test according to standard DIN 4102-B2. The samples pass the test.

The thermal conductivity measured on the expanded items obtained from a block of expanded material was 30.8 mW/mK (measured according to method ISO 8301). The density of the expanded slabs is 16.1 g/l. The expandable granules contain 380 ppm of hydrobromic acid.

Comparative Example 4 (Continuous Mass Process)

82.1 parts of polystyrene N1782; 3 parts of SAN sold by Versalis as Kostil B 855 (containing 15% acrylonitrile with MFI=5 g/10 minutes at 200° C.-5 Kg); and 14.9 parts of calcined carbon coke 4287 Asbury are mixed in a twin-screw extruder. The extruded product is used as concentrated material, in the production of expandable composites according to the present invention.

89.8 parts of ethylbenzene, 786.2 parts of styrene, 0.2 parts of divinylbenzene and 123.8 parts of the concentrate prepared as above are fed into an agitated reactor and dissolved for a total of 1000 parts. The reaction is performed at 125° C. with an average residence time of 2 hours. The fluid composition at the outlet is then fed to a second reactor where the reaction is completed at 135° C. with an average residence time of 2 hours.

The reactive polymeric composition, having a 72% conversion, is heated to 240° C. and then fed to the devolatilizer to remove the solvent and the residual monomer. The resulting composition has a glass transition temperature of 101° C., a melt flow index (MFI 200° C., 5 kg) of 9 g/10 min, a molecular weight MW of 190000 g/mol and a MW/Mn ratio of 2.8, where MW is the weight-average molecular weight and Mn is the number-average molecular weight.

The vinyl aromatic composition is collected in a heated tank and fed to a heat exchanger for lowering its temperature to 200° C.

109.1 parts of polystyrene N2982, 37.8 parts of Tetrabromobisphenol A bis (2,3 dibromopropylether) and 3.1 parts of Perkadox 30® (2,3-dimethyl-2,3-diphenylbutane, sold by Akzo Nobel), for a total of 150 parts are fed into a twin-screw extruder. A gear pump increases the supply pressure of the molten additive to 260 barg. 50 parts of a mixture of n-pentane (70%) and iso-pentane (30%) are then pressurized and injected to the supply of the additive. The mixture is completed through static mixers, at a temperature of about 200° C.

The composition thus mixed is added to 850 parts of the vinyl aromatic composition coming from the heat exchanger. The ingredients are then mixed through static mixing elements for a calculated average (residence) time of 7 minutes. The composition is then distributed to the chain, where it is extruded through a number of holes having a diameter of 0.5 mm, immediately cooled with a jet of water and cut with a series of rotating knives (according to USA patent no. 2005/0123638). The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is prepared by adding to the above 1.5 parts of glyceryl monostearate, 1 part of glyceryl tristearate, 1 part of zinc stearate and 0.2 parts of polysorbate 80 (sold by the company Croda with the commercial name Crillet 4 Super) for 1000 parts of dried granulated pearls. The coating additives are mixed with the granulate through a continuous screw mixer. The size of the expandable granules subjected to the expansion process is comprised between 0.9 and 1.6 mm.

The product has been pre-expanded in a discontinuous pre-expander produced by the company AMD, model P125 D (useful volume at level: 125 liters), using steam at the temperature of 100° C. The pressure of the steam used for the pre-expansion of the polymeric granules was set at 0.1 bar. The quantity of expandable granules fed to the pre-expander is 1000 g. The expanded pearls were left to mature for 12 hours and then used for molding blocks (dimensions 1040 mm×1030 mm×550 mm).

Some slabs obtained from the block of expanded material are placed in the oven at 70° C. for 2 days (residual pentane less than 0.15%): then the samples (9 cm×19 cm×2 cm) are obtained for the fire behavior test according to standard DIN 4102-B2. The samples pass the test. The thermal conductivity was 33.8 mW/mK (measured according to method ISO 8301). The density of the expanded slabs is 16.5 g/l. The expandable granules contain 180 ppm of hydrobromic acid.

Example 4

Comparative example 4 was repeated. The masterbatch with the Flame Retardant additives was prepared by feeding 130.1 g of polystyrene N2982, a mixture of flame retardants comprising 12.6 parts of tetrabromobisphenol A 2,3 dibromopropyl ether, 4.2 parts of brominated styrene/butadiene block copolymer (Emerald Innovation 3000) and 3.1 parts of Perkadox 30 (2,3 dimethyl diphenyl butane, Akzo Nobel) for a total of 150 parts, to the twin-screw extruder.

As reported in comparative example 2, the ingredients are then mixed through static mixing elements for a calculated average (residence) time of 7 minutes. The composition is then distributed to the chain, where it is extruded through a number of holes having a diameter of 0.5 mm, according to the methods described in comparative example 1. The granulation pressure is 5 barg and the cutting deformation speed is chosen so as to obtain granulates having an average diameter of 1.2 mm. The water is used as spraying liquid and the nitrogen as a carrier gas. The ratio between the flow rate of the sprayed water and the flow rate of the polymeric mass is 30 and that between nitrogen and the polymeric mass is 20. The water temperature is 40° C.

The resulting granulated pearls are dried with a centrifugal dryer and then coated. The coating is the same one used in comparative example 1. The coating additives are mixed with the granulate through a continuous screw mixer.

The expansion of the granulated pearls and the molding were performed as described in comparative example 1. Some slabs still obtained as in comparative example 1 are placed in the oven at 70° C. for 2 days (residual pentane <0.15%): then the samples (9 cm×19 cm×2 cm) are obtained for the fire behavior test according to standard DIN 4102-B2. The samples pass the test.

The thermal conductivity measured on the expanded items obtained from a block of expanded material was 33.6 mW/mK (measured according to method ISO 8301). The density of the expanded slabs is 15.9 g/l. The expandable granules contain 280 ppm of hydrobromic acid.

Method for the Determination of Bromides.

A weighed sample of 0.1-1.5 g (based on the expected bromides) of polymeric composition containing the brominated compound is placed in a 50 ml test tube and dissolved with 15 ml of chloroform. After dissolving, 25 ml of eluent are added for ion chromatography (aqueous solution of $NaHCO_3$ 0.0020 M and $Na_2CO_3$ 0.0013 M), the test tube is closed and shaken for 20 minutes. After shaking, the organic and aqueous phases are left to separate and the latter is analyzed with ion chromatography Metrohm Mod. Compact 761 IC with Metrohm Dual2 column (Cod. 6.1006.100) and conductivity suppressor, with Metrosep A Supp 4/5 pre-column (Cod. 6.1006.500). The concentration of the solution is obtained from the chromatogram and expressed in ppm p/p.

TABLE 1

| Examples | Coke % (p/p) | FR CAS: 3194-55-6 % (p/p) | FR CAS: 21850-44-2 % (p/p) | FR CAS: 9741684-7 % (p/p) | FR CAS: 1195978-93-8 % (p/p) | HBr (ppm) | Density of items (g/l) |
|---|---|---|---|---|---|---|---|
| Comp. Example 1 | 5.7 | 2.0 | | | | 2150 | 17.0 |
| Comp. Example 2 | 5.7 | | 3.6 | | | 290 | 16.7 |
| Comp. Example 3 | 5.7 | | | 2.1 | | 1800 | 16.8 |
| Comp. Example 4 | 1.5 | | 3.4 | | | 180 | 16.5 |
| Example 1 | 5.7 | | 1.5 | | 0.5 | 250 | 15.8 |
| Example 2 | 5.7 | | 1.5 | 0.2 | 0.3 | 280 | 16.0 |
| Example 3 | 5.7 | | 1.6 | 0.5 | | 380 | 16.1 |
| Example 4 | 1.5 | | 1.2 | | 0.4 | 160 | 15.9 |

The invention claimed is:

1. An expandable polymeric composition comprising:
   a) a polymeric matrix containing vinyl aromatic polymers and/or copolymers;
   b) from 0.1% to 20% by weight, calculated on the polymeric matrix (a), of an athermanous agent comprising coke;
   c) at least 0.01% by weight, calculated on the polymeric matrix (a), of at least one non-polymeric brominated flame retardant additive;
   d) at least 0.15% by weight, calculated on the polymeric matrix (a), of at least one brominated polymer containing at least 50% bromine;
   wherein a combined amount of said non-polymeric brominated flame retardant additive c) and the at least one said brominated polymer d) containing at least 50% bromine, calculated on the polymeric matrix (a), is not more than 2.1% by weight;
   e) from 0.01% to 5% by weight, calculated on the polymeric matrix (a), of a synergistic flame retardant additive selected from peroxides and unstable hydrocarbons;
   f) from 1% by weight to 10% by weight of at least one blowing agent;
   wherein the composition passes fire requirements of test DIN 4101-B2.

2. A polymeric composition according to claim 1 wherein the amount of non-polymeric brominated flame retardant additive c) ranges from 0.2% to 1.7% by weight and is calculated on the polymeric matrix (a).

3. A polymeric composition according to claim 2 wherein the amount of the brominated polymer d) containing at least 50% bromine ranges from 0.15% to 0.5% by weight and is calculated on the polymeric matrix (a).

4. A polymeric composition according to claim 3 wherein said non-polymeric brominated flame retardant additive c) comprises at least two derivatives of Bisphenol A.

5. A polymeric composition according to claim 4 wherein the derivatives of Bisphenol A are selected from Tetrabromobisphenol A bis (2,3 dibromopropylether), Tetrabromobisphenol A Bis (2 methyl 2,3 dibromopropyl ether), Tetrabromobisphenol A bis (2-hydroxyethyl) ether, Tetrabromobisphenol A bis allyl ether, Tetrabromobisphenol A, Tetrabromobisphenol A bis (glycidyl ether); and mixtures thereof.

6. A polymeric composition according to claim 1 wherein said brominated polymer d) containing at least 50% bromine is selected from brominated polystyrene, the copolymer Tetrabromobisphenol A 2,2 Bis [4-(2,3 epoxypropoxy)-dibromophenyl]-propane, brominated polybutadiene, and brominated styrene-butadiene block copolymers, and mixtures thereof.

7. A polymeric composition according to claim 1 wherein said vinyl aromatic polymers are obtained by homo-polymerization or copolymerization of the vinyl aromatic monomers selected from styrene, α-methylstyrene, vinyltoluene isomers, ethylstyrene isomers, propylstyrene isomers, chlorostyrene isomers, methyl chlorostyrene isomers, methoxystyrene isomers, acetoxystyrene isomers, hydroxystyrene isomers, methylhydroxystyrene isomers, and mixtures thereof.

8. A polymeric composition according to claim 1 wherein the amount of synergistic flame retardant additive e) ranges between 0.05% to 1%, calculated with respect to the polymer matrix (a).

9. A polymeric composition according to claim 1 which comprises from 0.5% by weight to 5.7% by weight, calculated on the polymeric matrix (a), of said athermanous agent.

10. A polymeric composition according to claim 1 wherein said coke has a particle size $D_{90}$ comprised from 0.2 to 100 microns and a surface area comprised from 5 m²/g to 200 m²/g; the surface area is measured according to ASTM D-3037-89; the size $D_{90}$ of the coke particles is measured with a Malvern 2000 type laser particle size analyzer damp; the measurement is taken according to method ISO 13320; during the measurement, particles of said coke are dispersed in distilled water.

11. A molded item formed from an expandable polymeric composition, the composition comprising:
   a) a polymeric matrix containing vinyl aromatic polymers and/or copolymers;
   b) from 0.1% to 20% by weight, calculated on the polymeric matrix (a), of an athermanous agent comprising coke or carbon black;
   c) from 0.01% to 4% by weight, calculated on the polymeric matrix (a), of at least one non-polymeric brominated flame retardant additive;
   d) from 0.01% to 10% by weight, calculated on the polymeric matrix (a), of at least one brominated polymer containing at least 50% bromine;
   wherein said at least one brominated polymer that contains at least 50% bromine, is selected from copolymer Tetrabromobisphenol A 2,2 Bis [4-(2,3 epoxypropoxy)-dibromophenyl]-propane, brominated polybutadiene, and brominated styrene-butadiene block copolymers, and mixtures thereof;
   e) from 0.01% to 5% by weight, calculated on the polymeric matrix (a), of a synergistic flame retardant additive;
   f) from 1% by weight to 10% by weight of at least one blowing agent, wherein said molded item is formed from molded expanded granules comprising the composition, and said molded item has a density of not more than 16.1 g/l, an HBr content of not more than 380 ppm measured by the Method for the Determination of Bromides and a thermal conductivity of not more than 30.8 mW/mK as measured according to method ISO 8301;
   wherein said molded item passes fire requirements of test DIN 4101-B2.

12. The molded item according to claim 11 wherein the density is not more than 16.0 g/l, the HBr content is not more than 280 ppm measured by the Method for the Determination of Bromides and the thermal conductivity is not more than 30.3 mW/mK as measured according to method ISO 8301.

13. The molded item according to claim 11 wherein the amount of non-polymeric brominated flame retardant additive c) ranges from 0.2% to 2.3% by weight and is calculated on the polymeric matrix (a).

14. The molded item according to claim 11 wherein the amount of said at least one brominated polymer d) containing at least 50% bromine ranges from 0.01% to 4% by weight and is calculated on the polymeric matrix (a).

15. The molded item according to claim 11 wherein the amount of said at least one brominated polymer d) containing at least 50% bromine ranges from 0.25% to 0.8% by weight and is calculated on the polymeric matrix (a).

16. The molded item according to claim 11 wherein said non-polymeric brominated flame retardant additive c) is selected from Tetrabromobisphenol A bis (2,3 dibromopropylether), Tetrabromobisphenol A Bis (2 methyl 2,3 dibromopropyl ether), Tetrabromobisphenol A bis (2-hydroxyethyl) ether, Tetrabromobisphenol A bis allyl ether, Tetrabromobisphenol A, Tetrabromobisphenol A bis (glycidyl ether); and mixtures thereof.

* * * * *